(12) United States Patent
Cho et al.

(10) Patent No.: US 11,450,086 B2
(45) Date of Patent: Sep. 20, 2022

(54) ELECTRONIC DEVICE AND METHOD FOR CONTROLLING SAME

(71) Applicant: SAMSUNG ELECTRONICS CO., LTD., Suwon-si (KR)

(72) Inventors: Han-su Cho, Suwon-si (KR); Kyung-hoon Kim, Suwon-si (KR); Young-hwan Park, Yongin-si (KR); Suk-jin Kim, Seoul (KR); Hyun-jung Kim, Suwon-si (KR); Dong-wook Kwon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 315 days.

(21) Appl. No.: 16/617,967

(22) PCT Filed: Jun. 5, 2018

(86) PCT No.: PCT/KR2018/006400
§ 371 (c)(1),
(2) Date: Nov. 27, 2019

(87) PCT Pub. No.: WO2018/226014
PCT Pub. Date: Dec. 13, 2018

(65) Prior Publication Data
US 2020/0117942 A1    Apr. 16, 2020

Related U.S. Application Data

(60) Provisional application No. 62/516,389, filed on Jun. 7, 2017.

(30) Foreign Application Priority Data

Oct. 31, 2017  (KR) ........................ 10-2017-0144071

(51) Int. Cl.
*G06V 10/44* (2022.01)
*G06F 9/26* (2006.01)
(Continued)

(52) U.S. Cl.
CPC ............ *G06V 10/454* (2022.01); *G06F 9/267* (2013.01); *G06N 3/063* (2013.01); *G06N 3/08* (2013.01)

(58) Field of Classification Search
CPC ...... G06K 9/4628; G06K 9/6256; G06K 9/66; G06K 9/4642; G06K 9/6215;
(Continued)

(56) References Cited

U.S. PATENT DOCUMENTS 7,016,529 B2  3/2006  Simard et al.
7,359,576 B1  4/2008  Worthington et al.
(Continued)

FOREIGN PATENT DOCUMENTS

JP         4314017 B2      8/2009
KR   10-2003-0009682 A    2/2003
(Continued)

OTHER PUBLICATIONS

Extended European Search Report dated Mar. 20, 2020 in European Patent Application No. 18812967.0.
(Continued)

*Primary Examiner* — Michael S Osinski
(74) *Attorney, Agent, or Firm* — Staas & Halsey LLP

(57) ABSTRACT

Disclosed is an electronic device and method for controlling same. The electronic device comprises: a memory; and a processor which checks an operation instruction for filtering input data of a neural network for each filter of a main pattern selected from a plurality of filters generated according-
(Continued)

ing to learning by the neural network, and stores the checked operation instruction in the memory.

13 Claims, 11 Drawing Sheets

(51) Int. Cl.
  *G06N 3/063* (2006.01)
  *G06N 3/08* (2006.01)
(58) Field of Classification Search
  CPC .. G06K 9/6219; G06K 9/6257; G06K 9/6281; G06F 9/267; G06F 16/2219; G06F 17/153; G06F 17/16; G06F 17/17; G06F 2207/4824; G06N 3/063; G06N 3/08; G06N 3/04; G06N 3/0454; G06N 3/084; G06N 3/082; G06N 3/0481; G06T 2207/20081–20084; G06T 2207/10016; G06T 5/20
  See application file for complete search history.

(56) References Cited

U.S. PATENT DOCUMENTS

| | | | |
|---|---|---|---|
| 7,734,117 | B2 | 6/2010 | Tannhof et al. |
| 8,442,927 | B2 | 5/2013 | Chakradhar et al. |
| 9,547,820 | B2 | 1/2017 | Kim et al. |
| 9,786,036 | B2* | 10/2017 | Annapureddy .......... G06K 9/66 |
| 9,952,831 | B1* | 4/2018 | Ross ........................ G06F 7/78 |
| 10,025,755 | B2 | 7/2018 | Saber et al. |
| 10,481,914 | B2* | 11/2019 | Bolbenes ............ G06F 9/30058 |
| 11,132,605 | B2* | 9/2021 | Dasgupta ................ G06N 3/08 |
| 11,164,071 | B2* | 11/2021 | El-Khamy ............... G06N 3/06 |
| 2005/0071300 | A1* | 3/2005 | Bartlett ................ G06K 9/6215 706/12 |
| 2006/0067570 | A1* | 3/2006 | Onishi ..................... G06T 7/001 382/147 |
| 2010/0063948 | A1* | 3/2010 | Virkar ...................... G06N 3/02 706/12 |
| 2010/0166315 | A1 | 7/2010 | Paquier |
| 2013/0024415 | A1* | 1/2013 | Herzog .............. G05B 23/0254 706/52 |
| 2014/0086479 | A1* | 3/2014 | Luo ....................... G06K 9/6249 382/156 |
| 2014/0241623 | A1* | 8/2014 | Wang ................... G06K 9/6211 382/160 |
| 2014/0270367 | A1* | 9/2014 | Wang ................... G06K 9/4676 382/103 |
| 2016/0086078 | A1 | 3/2016 | Ji et al. |
| 2016/0358068 | A1* | 12/2016 | Brothers ................ G06N 3/082 |
| 2016/0358069 | A1 | 12/2016 | Brothers et al. |
| 2016/0358070 | A1* | 12/2016 | Brothers .............. G06N 3/0454 |
| 2018/0084280 | A1* | 3/2018 | Thiagarajan ........... H04N 19/61 |
| 2018/0181829 | A1* | 6/2018 | Morozov ................. G06N 3/08 |
| 2018/0189643 | A1* | 7/2018 | Kim ...................... G06N 3/0454 |
| 2018/0300624 | A1* | 10/2018 | El-Khamy ............... G06F 5/01 |
| 2019/0095790 | A1* | 3/2019 | Ling .................... G06N 3/0454 |
| 2019/0114734 | A1* | 4/2019 | Chen .......................... G06T 1/20 |
| 2019/0129297 | A1* | 5/2019 | Shim ........................ G03F 1/36 |
| 2019/0130265 | A1* | 5/2019 | Ling ........................ G06N 3/08 |
| 2019/0138315 | A1* | 5/2019 | Bolbenes .............. G06F 9/3848 |
| 2019/0156192 | A1* | 5/2019 | Dasgupta ............. G06N 3/0481 |
| 2019/0174131 | A1* | 6/2019 | Abe ...................... H04N 19/157 |
| 2019/0188526 | A1* | 6/2019 | Chen ........................ G06N 3/08 |
| 2019/0197656 | A1* | 6/2019 | Yoda ...................... G06F 17/16 |
| 2020/0202502 | A1* | 6/2020 | Tsymbalenko ............ G06T 5/50 |

FOREIGN PATENT DOCUMENTS

| | | |
|---|---|---|
| KR | 10-0442434 B1 | 7/2004 |
| KR | 10-2016-0034814 A | 3/2016 |
| KR | 10-2016-0142791 A | 12/2016 |
| KR | 10-2017-0005562 A | 1/2017 |

OTHER PUBLICATIONS

Angshuman Parashar et al, "SCNN: An Accelerator for Compressed-sparse Convolutional Neural Networks", XP055569818, May 23, 2017, 12 pages.

Bert Moons et al., "14.5 Envision: A 0.26-to-10TOPS/W Subword-Parallel Dynamic-Voltage-Accuracy-Frequency-Scalable Convolutional Neural Network Processor in 28nm FDSOI" IEEE International Solid-State Circuits Conference, Feb. 2017, pp. 246-247.

International Search Report dated Sep. 18, 2018 in corresponding International Application No. PCT/KR2018/006400.

Written Opinion of the International Searching Authority dated Sep. 18, 2018 in corresponding International Application No. PCT/KR2018/006400.

European Communication dated Sep. 2, 2020 in European Patent Application No. 18812967.0.

Jun Liu et al., "Variable Length Dominant Gabor Local Binary Pattern (VLD-GLBP) for Face Recognition", 2014 IEEE Visual Communications and Image Processing Conference, Dec. 2014, pp. 89-92.

European Office Action for European Application No. 18 812 967.0 dated Feb. 9, 2022.

* cited by examiner

■ Non-zero ☐ zero

PATTERN1

PATTERN2

PATTERN3

PATTERN4

PATTERN5

PATTERN6

PATTERN7

PATTERN8

PATTERN9

ELECTRONIC DEVICE AND METHOD FOR CONTROLLING SAME

CROSS-REFERENCE TO RELATED APPLICATIONS

This application is a U.S. National Stage Application which claims the benefit under 35 U.S.C. § 371 of International Patent Application No. PCT/KR2018/006400 on Jun. 5, 2018, which claims priority benefit under 35 U.S.C. § 119 of Korean Patent Application No. 10-2017-0144071 filed on Oct. 31, 2017, in the Korean Intellectual Property Office, and U.S. Provisional Patent Application No. 62/516,389 filed on Jun. 7, 2017, the contents of all of which are incorporated herein by reference.

TECHNICAL FIELD

The disclosure relates to an electronic device and a method for controlling the same, and more particularly, to an electronic device and a method for controlling the same for reducing an operation amount required in a process of performing learning by a neural network.

BACKGROUND ART

Machine learning, which is a field of artificial intelligence, refers to a technology for researching and building a system for predicting the future and improving its performance by collecting and analyzing large-scale big data and algorithms for system.

In recent years, with the development of hardware technology, as it is possible to collect and store big data and computer skills and technologies for analyzing the big data become more sophisticated and faster, a research into machine learning, which is an algorithm that may recognize things and understand information like humans, has actively been conducted. In particular, in the field of machine learning technology, a research on deep learning of self-learning method using a neural network is active.

The neural network is an algorithm in which an active function determines a final output by comparing a sum obtained by multiplying a plurality of inputs by weight with a specific boundary value based on the intention to actively mimic a function of a brain of the human, and generally includes a plurality of layers. Representative examples of the neural network include a convolutional neural network (hereinafter, CNN), which is widely used for image recognition, a recurrent neural network (hereinafter, RNN), which is widely used for speech recognition, and the like.

However, in the conventional CNN, since a filtering operation by convolution is basically performed, many operations are required as a plurality of filters are applied to input data. That is, as convolution operations are repeated for feature map generation, the large amount of operations and high-capacity neural network parameters are required, which in turn has led to problems of degradation in operation speed and inefficient use of a memory.

Therefore, in the machine learning, there is a need for a method for reducing a burden of such an operation.

DISCLOSURE

Technical Problem

The disclosure provides an electronic device and a method for controlling the same for improving operation speed and memory usage in an operation process of a neural network.

Technical Solution

According to an embodiment of the disclosure, an electronic device includes: a memory; and a processor configured to check an operation instruction for filtering input data of a neural network for each filter of a main pattern selected from a plurality of filters generated according to learning by the neural network, and store the checked operation instruction in the memory.

The processor may perform a filtering operation by the filter of the main pattern by using the stored operation instruction.

The filter of the main pattern may be a filter selected based on a statistical weight of an operation amount occupied by each pattern for each pattern in which non-zero elements are arranged, in the plurality of generated filters.

The processor may select the main pattern based on a frequency for each pattern in which non-zero elements are arranged, in the plurality of generated filters.

The electronic device may further include a communicator, wherein the processor may transmit the operation instruction to the other electronic device through the communicator, and the other electronic device may perform a filtering operation by the filter of the main pattern by using the operation instruction.

The processor may check optimization data in which zero elements are removed from the selected filter of the main pattern and an operation instruction corresponding to the optimization data, and store the checked optimization data and operation instruction in the memory.

The processor may perform a filtering operation by the filter of the main pattern by using the stored optimization data and an operation instruction corresponding to identification information included in the optimization data.

The processor may transmit the optimization data and the operation instruction to the other electronic device through the communicator, and the other electronic device may perform a filtering operation by the filter of the main pattern by using the received optimization data and an operation instruction corresponding to identification information included in the optimization data.

According to another embodiment of the disclosure, a method for controlling an electronic device includes: checking an operation instruction for filtering input data of a neural network for each filter of a main pattern selected from a plurality of filters generated according to learning by the neural network; and storing the checked operation instruction.

The method may further include performing a filtering operation by the filter of the main pattern by using the stored operation instruction.

The filter of the main pattern may be a filter selected based on a statistical weight of an operation amount occupied by each pattern for each pattern in which non-zero elements are arranged, in the plurality of generated filters.

In the checking of the operation instruction, the main pattern may be selected based on a frequency for each pattern in which non-zero elements are arranged, in the plurality of generated filters.

The method may further include transmitting the stored operation instruction to the other electronic device, wherein the other electronic device may perform a filtering operation by the filter of the main pattern by using the operation instruction.

In the checking of the operation instruction, optimization data in which zero elements are removed from the selected filter of the main pattern and an operation instruction corresponding to the optimization data may be checked, and in the storing of the checked operation instruction, the checked optimization data and operation instruction may be stored.

The method may further include performing a filtering operation by the filter of the main pattern by using the stored optimization data and an operation instruction included in the optimization data.

The method may further include transmitting the stored optimization data and the operation instruction to the other electronic device, wherein the other electronic device may perform a filtering operation by the filter of the main pattern by using the optimization data and an operation instruction corresponding to identification information included in the optimization data.

Advantageous Effects

According to the diverse embodiments of the disclosure described above, in the operation required for the machine learning, the operation speed and the operation amount may be greatly reduced, and the memory usage may also be reduced compared to the conventional memory usage.

BEST MODE

Mode for Invention

Figure 1A:
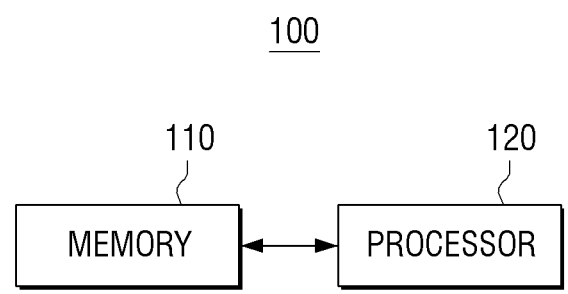
FIGS. 1A and 1B are block diagrams schematically illustrating a configuration of an electronic device according to different embodiments of the disclosure.

Before describing the disclosure in detail, a method of describing the specification and drawings will be described.

First, the terms used in the specification and claims have chosen generic terms in consideration of the function of the disclosure. However, these terms may vary depending on the intentions of those skilled in the art, legal or technical interpretation, and emergence of new technologies. In addition, some terms are arbitrarily chosen by the applicant. These terms may be construed as meaning as defined herein, and may be interpreted based on the general contents of the specification and common technical knowledge in the related art, unless otherwise defined.

In addition, like reference numerals or symbols in the drawings attached to the specification denote parts or components that perform substantially the same functions. For convenience of explanation and understanding, different embodiments will be described using the same reference numerals or symbols. That is, although all of the components having the same reference numerals are shown in the drawings, the drawings do not imply one embodiment.

In addition, in the specification and claims, the terms including ordinal numbers such as "first" and "second" may be used to distinguish between the components. These ordinal numbers are used to distinguish the same or similar components from each other, and the meaning of the terms should not be construed as being limited by the use of these ordinal numbers. As an example, the components combined with these ordinal numbers should not be construed as limiting their order of use or placement. The respective ordinal numbers are interchangeably used, if necessary.

In the specification, the singular forms include the plural forms unless the context clearly indicates otherwise. It should be understood that terms "comprise" or "include" used in the specification, specify the presence of features, numerals, steps, operations, components, and parts mentioned in the specification, or combinations thereof, but do not preclude the presence or addition of one or more other features, numerals, steps, operations, components, parts, or combinations thereof.

A term "module", "unit", "part", or the like, in the embodiment of the disclosure is a term for referring to the component performing at least one function or operation, and such a component may be implemented in hardware or software or a combination of hardware and software. In addition, a plurality of "modules", "units", "parts", or the like may be integrated into at least one module or chip and may be implemented in at least one processor (not illustrated), except for a case in which they need to be each implemented in individual specific hardware.

In addition, in an embodiment of the disclosure, when a part is connected to another part, this includes not only a direct connection but also an indirect connection through another medium. In addition, the meaning that any portion "comprises" any component means that any portion does not exclude other components but may further include other components, unless explicitly described otherwise.

Hereinafter, the disclosure will be described in detail with reference to the accompanying drawings.

Figure 1B:
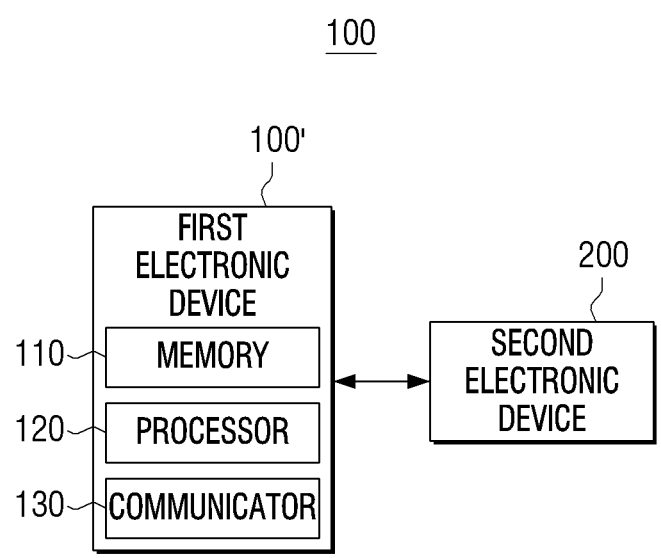

FIGS. 1A and 1B are block diagrams schematically illustrating a configuration of an electronic device according to an embodiment of the disclosure.

Referring to FIG. 1A, an electronic device 100 performing learning by a neural network includes a memory 110 and a processor 120.

The memory 110 is configured to store learning data by a neural network. Here, the learning data may include a plurality of filters generated according to the learning by the neural network. In this case, the memory 110 may store data for which preprocessing has been performed on the plurality of generated filters, which will be described later.

The memory 110 may be implemented as a memory of various formats such as a hard disk drive (HDD), a solid state drive (SSD), a DRAM memory, an SRAM memory, an FRAM memory, or a flash memory.

The processor 120 is configured to control an overall operation of the electronic device 100. The processor 120 performs preprocessing on filters of main patterns selected from the plurality of filters generated by the learning of the neural network.

Here, the filter is defined as a matrix of weights as a mask with weights. The filters are also known as windows or kernels. The weights that make up the matrix in the filter include 0 (zero value) or zero elements that may be approximated to 0, and non-zero elements having a constant value between 0 and 1, and may have various patterns according to a function thereof.

For example, in a case in which the neural network is implemented as a convolution neural network (hereinafter, CNN) for recognizing images, the processor 120 may apply a filter having a weight to an input image, and extract a feature map by determining a sum (convolution operation) of values obtained by multiplying the weights of the image and the filter as a pixel value of an output image. The input image may be extracted in plural through multiple filters to extract a robust feature, and a plurality of feature maps may be extracted according to the number of filters. Such a convolution image may be repeated by multiple layers. In this case, filters to be learned vary depending on a learning object of the CNN, and patterns of the selected filters also vary. That is, depending on what the CNN learns, such as cats, puppies, pigs, and cows, the filters to be learned and the filters to be selected vary.

As described above, the processor 120 may determine which type of feature the input original data has by combining multiple filters capable of extracting different features and applying the combined filter to the CNN.

On the other hand, the filter of the main pattern is a filter in which the non-zero element is arranged as the main pattern among the plurality of learned filters, and refers to a filter including patterns occupying an amount of operation greater than or equal to a predetermined ratio during a filtering operation, or a filter including patterns occupying a frequency greater than or equal to a predetermined ratio among the plurality of learned filters. This will be described in detail with reference to FIGS. 3A and 3B.

On the other hand, the preprocessing performed by the processor 120 includes a process of each checking operation instructions for filtering the input data of the neural network by using the filter of the selected main pattern for each filter of the selected main pattern. The operation instructions are instructions that replace the convolution operation for filtering the input data of the neural network, and may be compiled and identified. The checked operation instructions may be stored in the memory 110.

The processor 120 may perform a filtering operation by the filter of the main pattern according to the stored operation instructions. To this end, the processor 120 according to an embodiment may further include an operation module (not illustrated) for performing the filtering operation.

In addition, an electronic device 100' according to another embodiment may further include a communicator 130 as illustrated in FIG. 1B, and the processor 120 may transmit the operation instructions to the other electronic device 200 through the communicator 130. The other electronic device 200 may include an operation module and perform a filtering operation by the filter of the main pattern by using the operation instructions.

The communicator 130 may transmit and receive wireless signals with the other electronic device 200 in a mobile communication network established according to Global System for Mobile Communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), or the like.

In addition, the communicator 130 may support Wi-Fi, Bluetooth, and Wi-Fi Direct, and may include an Ethernet terminal for connection to a wired network.

In addition, the communicator 130 may transmit operation instructions to the other electronic device 200 by a wired manner, and in this case, may include a connector for connection to the other electronic device 200 by the wired manner.

On the other hand, the processor 120 may obtain optimization data that the zero elements are removed from the filter of the selected main pattern, and may check the operation instruction for performing the filtering operation according to the obtained optimization data. The processor 120 may remove the zero elements from the filter of the selected main pattern, and may generate the optimization data for the filter of the main pattern, which is composed of non-zero elements and identification information for identifying the pattern. In this case, the optimization data has a data structure in which the identification information and the non-zero elements are arranged in a line.

In addition, the operation instruction is an instruction for causing a specific processing element of a plurality of processing elements included in an operation module to perform a specific operation, in the operation module for filtering the input data of the neural network. The plurality of processing elements may be arranged in a predetermined structure to construct the operation module.

Such an operation module may be included in the other electronic device 200 performing the communication with the electronic device 100' as described above, and the electronic device 100' may transmit the optimization data and the operation instructions stored in the memory 110 to the other electronic device 200. The other electronic device 200 may perform the filtering operation of the neural network by the filter of the main pattern by using the optimization data and the operation instructions received from the electronic device 100'.

On the other hand, the processor 120 may each store the optimization data and the operation instruction corresponding to the filter of the main pattern in the memory 110 for each type of the main pattern.

Figure 2:
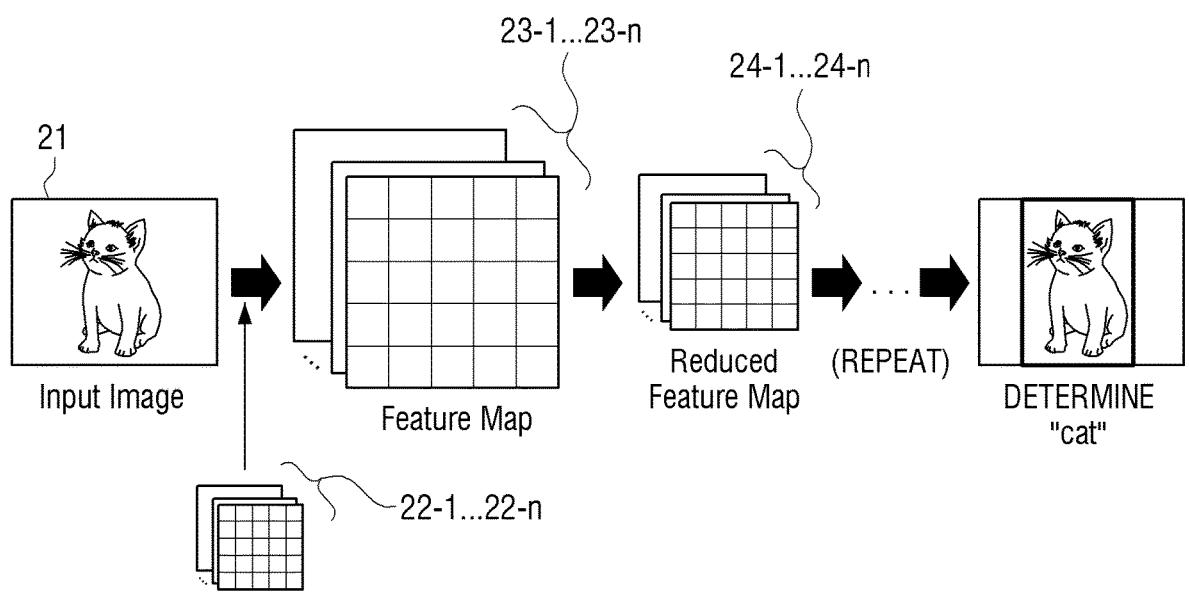
FIG. 2 is a diagram illustrating an operation process of a general CNN of performing a classification operation by applying a plurality of filters to input data according to an embodiment of the disclosure.

FIG. 2 illustrates an operation process of a general CNN of performing a classification operation by applying a plurality of filters to input data according to an embodiment of the disclosure.

As illustrated in FIG. 2, a plurality of filters 22-1 to 22-*n* may be applied to an input image 21 of a CNN. In this case, the filters 22-1 to 22-*n* differ depending on the type of CNN, but may generally include 64 to 512 types of filters. On the other hand, the input image 21 may be divided into a plurality of images before being input to the CNN and input to the CNN.

Here, the input image 21 may have a certain depth for representing color, and may be composed of three pieces of data represented by, for example, red (R), green (G), and blue (B).

The CNN basically has a structure in which a convolutional layer and a pooling layer are repeated. In the convolutional layer, a plurality of feature maps 23-1 to 23-*n* for the input image 21 are generated based on the number of the applied filters 22-1 to 22-*n*, and the plurality of generated feature maps are sampled in the pooling layer. As such a process is repeated, a plurality of feature maps 24-1 to 24-*n* having a reduced size may be generated. Finally, the input image 21 is classified as a specific object by a fully connected layer. FIG. 2 illustrates an example in which the input image 21 is classified as "cat".

Figure 3A:
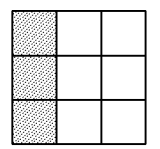
FIGS. 3A and 3B are diagrams for describing filters of main patterns according to an embodiment of the disclosure.
Figure 3A:
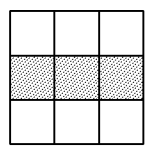
Figure 3A:
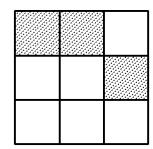
Figure 3A:
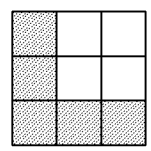
Figure 3A:
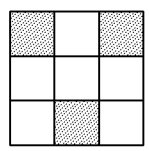
Figure 3A:
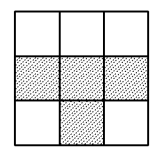
Figure 3A:
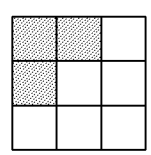
Figure 3A:
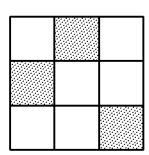
Figure 3A:
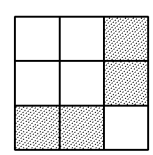
Figure 3B:
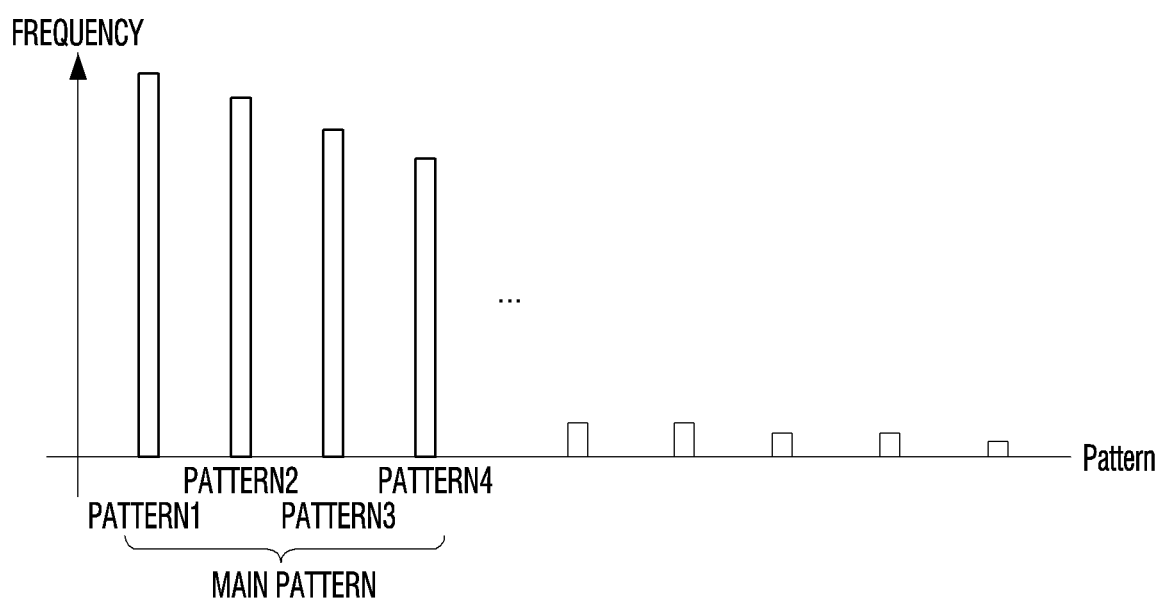

FIGS. 3A and 3B are diagrams for describing filters of main patterns according to an embodiment of the disclosure.

As illustrated in FIG. 3A, in the neural network, filters having a constant pattern based on the form in which a zero value or zero elements that may be approximated to the zero value and non-zero elements having a constant value between 0 and 1, not the zero value are arranged are used.

In this case, as illustrated in FIG. 3B, among the filters used in neural networks, there is a filter having a pattern that is used at a particularly high frequency, that is, a main pattern. The filter having the main pattern is widely used for all types of neural networks, and an image may be classified with a constant high probability using the filter having the main pattern. Since an operation amount for the filter having the main pattern statistically occupies a high operation ratio of the total operation amount of the neural network, operation efficiency may be increased by performing preprocessing on the main filters.

The processor 120 may select the main pattern based on a frequency for each pattern in which the non-zero elements are arranged, in the plurality of filters generated according to the learning by the neural network. That is, a predetermined number of patterns may be selected as the main pattern in order of a pattern having a relatively high frequency of appearance among the respective patterns of the generated filters. In addition, a pattern having a frequency of appearance of a predetermined number of times or more among the respective patterns of the generated filters may also be selected as the main pattern.

On the other hand, the filter of the main pattern may also be selected based on a statistical weight of an operation amount occupied by each pattern for each pattern in which the non-zero elements are arranged, in the plurality of filters generated according to the learning by the neural network. That is, a filter having a predetermined number of different main patterns may be selected according to the order in which a ratio of the occupied operation amount of the total operation amount required for processing the input data is high, and in this case, a certain number of filters whose sum of the operation amounts exceeds a certain ratio may be selected.

For example, in case of VGG16, which is a type of neural network, assuming that the number of recognition objects is 10, an operation amount required to apply filters of 20 patterns of filters of 215 patterns used in the VGC 16 to the input data occupies 60% of the total operation amount. In this case, the processor 120 may select the filters of 20 patterns, which occupy the operation amount of 60%, as filters to perform preprocessing. In addition, in case of ResNet, which is another type of neural network, assuming that the number of recognition objects is 80, an operation amount required to apply filters of 20 patterns of filters of 277 patterns used in the ResNet to the input data occupies 40% of the total operation amount. In this case, the processor 120 may select the filters of 20 patterns, which occupy the operation amount of 40%, as filters to perform preprocessing.

That is, although there are several hundred types of filters used in the neural network, the number of patterns occupying a predetermined threshold ratio of operation amount may be several tens among several hundred types of filters. In view of such a tendency, an object of the disclosure is to reduce an operation amount according to the convolution operation of the filter of the main pattern by storing in advance the operation instruction corresponding to the filtering of the input data by the applied filter, when the filter having the main pattern is applied to the input data.

On the other hand, in the embodiments described above, although it is assumed that the positions of the non-zero elements on a two-dimensional plane (x, y) of the filter have a predetermined pattern, the object of preprocessing may be extended to 'pattern' units rather than 'filter' units. In this case, when a main pattern of the non-elements exists in one region of the filter, the operation instruction for the region in which the main pattern exists may be stored in advance. In this case, an embodiment in which the operation is performed by using a pre-stored operation instruction for the region in which the main pattern exists, and the filtering operation by the conventional convolution is performed for the remaining regions other than the region in which the main pattern exists may also be included in the technical spirit of the disclosure. In addition, even in a case in which a main pattern of the non-elements exists in a depth (z) direction of the filter, the operation instruction for the region in which the main pattern exists may be stored in advance.

Figure 4:
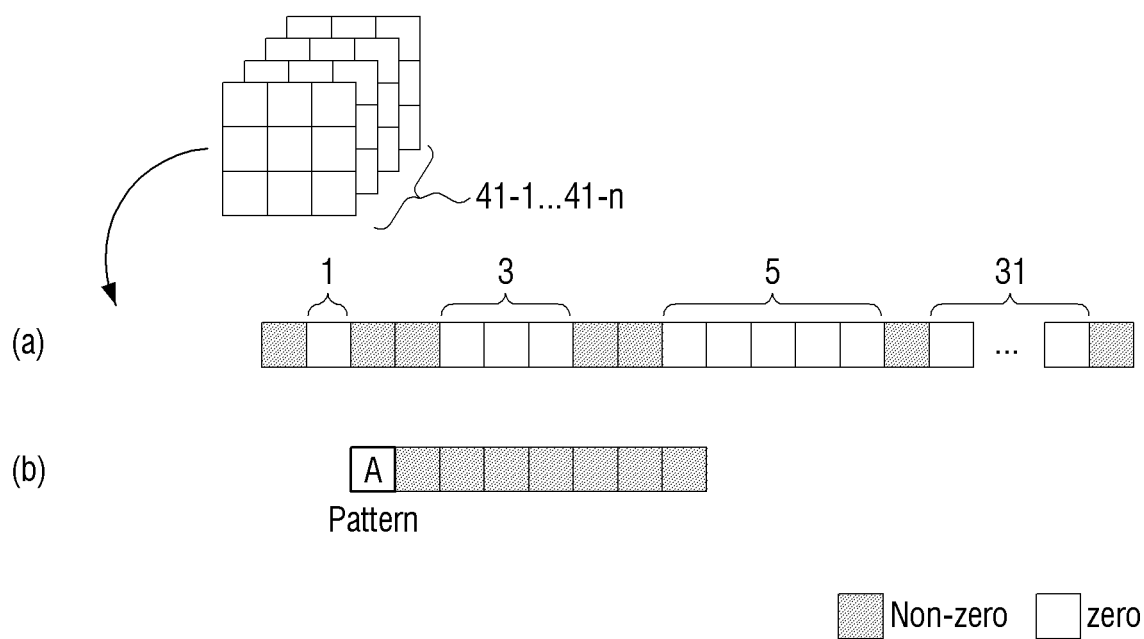
FIG. 4 is a diagram illustrating a structure of optimization data for a filter having a pattern A, which is one of the main patterns, according to an embodiment of the disclosure.

FIG. 4 illustrates a structure of optimization data for a filter having a pattern A, which is one of the main patterns.

When the input data of the neural network is filtered using a filter having a pattern A (hereinafter, filter A), which is the main pattern, among filters 41-1 to 41-*n* having a plurality of patterns, the filter A applied to the input data may have a data array structure in which non-zero elements and zero elements included in the filter A are arranged in series as illustrated in (a) of FIG. 4.

The optimization data of the filter A proposed in the disclosure has a structure in which a tag indicating that the applied filter is a pattern A is included in a first field area of the data array, and the remaining field areas are composed of only the non-zero elements of the filter A. Here, the tag functions as identification information for identifying the pattern A. In conclusion, the optimization data has a structure in which all zero elements are removed from an existing data array structure, and only the tag indicating a type of a pattern is added.

Figure 5:
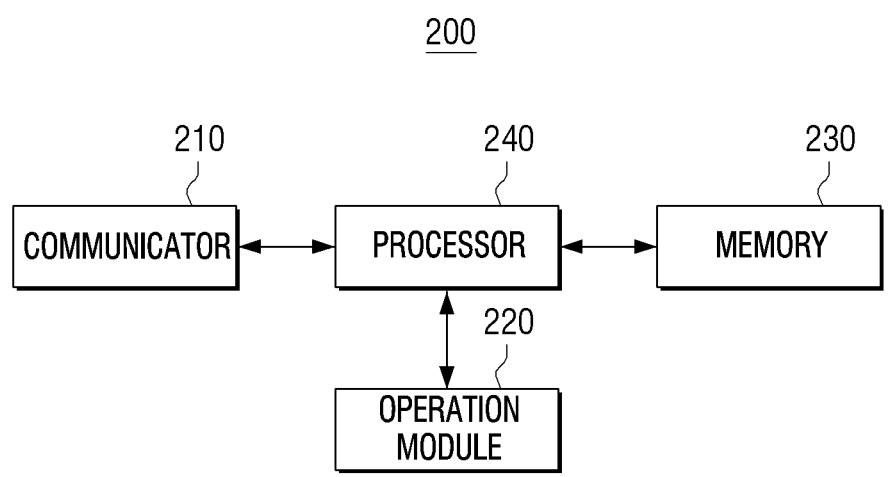
FIG. 5 is a block diagram schematically illustrating a configuration of the other electronic device according to an embodiment of the disclosure.

FIG. 5 is a block diagram schematically illustrating a configuration of the other electronic device according to an embodiment of the disclosure.

The other electronic device 200 is configured to apply the learning data received from the electronic device 100' to the CNN to generate a result that is determined or predicted from the input data as output data. Hereinafter, for convenience, the electronic device 100' will be referred to as a first electronic device and the other electronic device 200 will be referred to as a second electronic device.

Referring to FIG. 5, the second electronic device 200 includes a communicator 210, an operation module 220, a memory 230, and a processor 240.

The communicator 210 is configured to perform communication with the first electronic device 100' performing the learning by the neural network. The second electronic device 200 may receive an operation instruction of a filter selected by the first electronic device 100' from the first electronic device 100' through the communicator 210.

In addition, the second electronic device 200 according to another embodiment may also receive optimization data of the selected filter and an operation instruction corresponding to the optimization data from the first electronic device 100'. In addition, the communicator 210 may receive an updated operation instruction whenever the operation instruction is updated according to the learning of the first electronic device 100'.

In addition, the communicator 210 of the second electronic device 200 according to another embodiment may receive updated optimization data and an operation instruction whenever optimization data of the main filter and the operation instruction corresponding to the optimization data are updated according to the learning of the first electronic device 100'.

The communicator 210 may transmit and receive wireless signals with the first electronic device 100' in a mobile communication network established according to Global System for Mobile Communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), or the like.

In addition, the communicator 210 may support Wi-Fi, Bluetooth, and Wi-Fi Direct.

The operation module 220 includes a plurality of processing elements (PEs) arranged in a predetermined structure, and is configured to perform operation by sharing data between adjacent processing elements. For example, the PEs may be arranged in a structure of various types of networks, such as a mesh topology network and a tree topology network. The memory 230 is configured to store data in which the preprocessing has been performed on the filter of the main pattern. Specifically, the memory 230 stores the optimization data for the filter of the main pattern and the operation instruction corresponding to the optimization data received from the first electronic device 100'.

The memory 230 may be implemented as a memory of various formats such as a hard disk drive (HDD), a solid state drive (SSD), a DRAM memory, an SRAM memory, an FRAM memory, or a flash memory.

The processor 240 is configured to control an overall operation of the second electronic device 200. Specifically, the processor 240 may control the communicator 230 to receive the filter of the main pattern of the plurality of filters generated by the learning of the neural network and to receive the operation instruction corresponding to the main pattern, that is, the operation instruction for filtering the input data of the neural network by the filter of the main pattern, from the first electronic device 100'. The processor 240 stores the received operation instruction in the memory 230. When the filter of the main pattern is preprocessed with the optimization data in the first electronic device 100' and the optimization data and the operation instruction corresponding to the optimization data are received from the first electronic device 100', the processor 240 stores the optimization data and the operation instruction corresponding to the optimization data in the memory 230.

On the other hand, when the filter of the main pattern of the plurality of filters is applied to the input data, the processor 240 may check an operation instruction corresponding to the applied main pattern among the operation instructions stored in the memory 230.

The processor 240 derives an operation value based on the input data and the preprocessed optimization data according to the checked operation instruction. Specifically, the processor 240 may control the operation module 220 to obtain an operation instruction corresponding to identification information from the memory based on the identification information included in the optimization data, and to perform the filtering operation according to the obtained operation instruction.

In this case, the processor 240 may control the operation module 220 to obtain the operation instruction corresponding to the identification information included in the optimization data from the memory 230 and to perform the filtering operation according to the obtained operation instruction. The derived operation value is generally the same as the operation value that the input data is filtered based on the convolution operation by a filter of a predetermined pattern.

Figure 6:
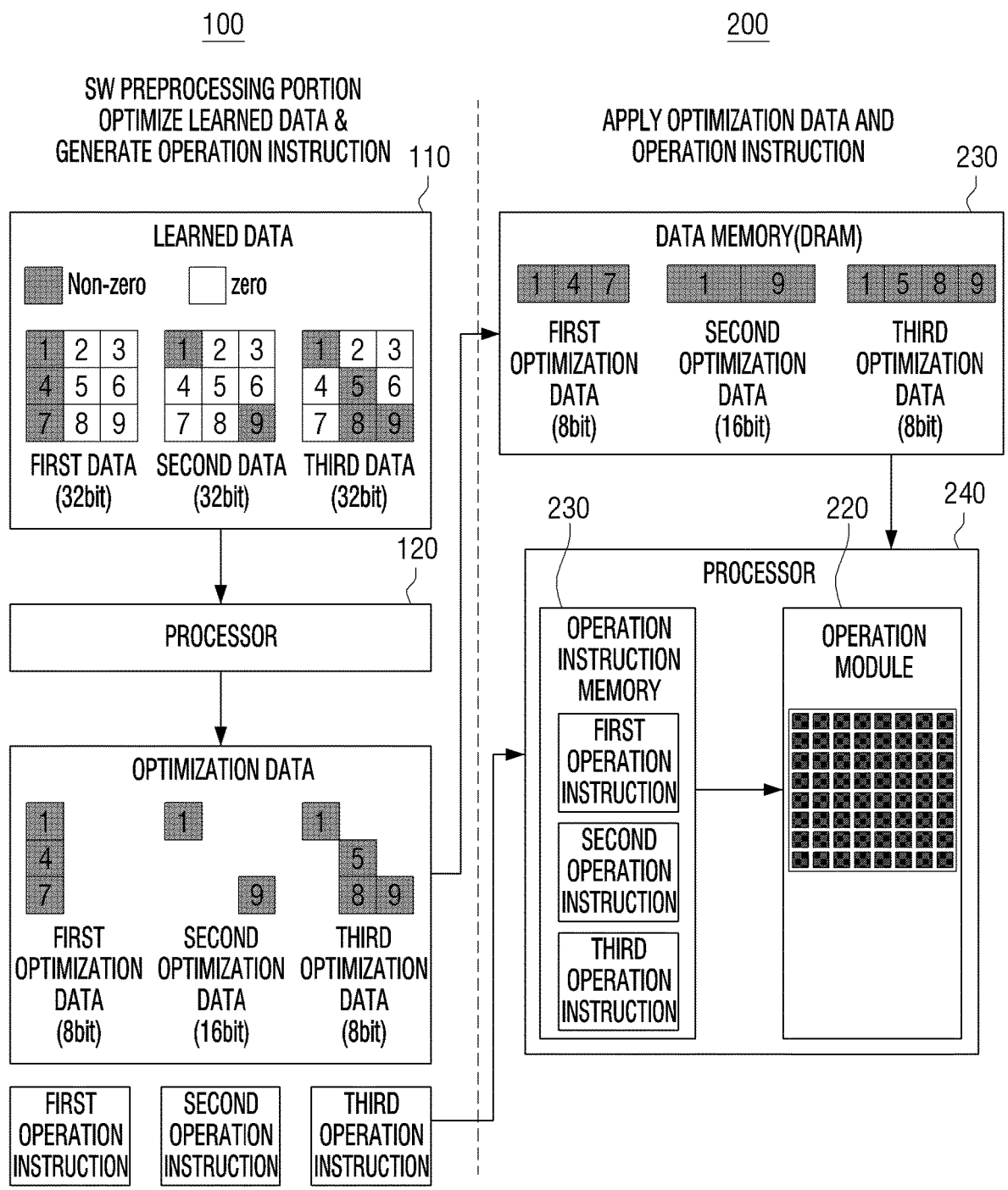
FIG. 6 is a diagram illustrating a machine learning system that receives operation instructions for the main filters from a server and performs a convolution operation using the operation instructions, according to an embodiment of the disclosure.

FIG. 6 illustrates a machine learning system that receives operation instructions for the main filters from the first electronic device and performs a convolution operation using the operation instructions, according to an embodiment of the disclosure. FIG. 6 illustrates an embodiment in which the first electronic device 100' performing the learning by the neural network is implemented as a server, and the second electronic device 200 performing the filtering operation for the input data using the data learned by the first electronic device is implemented as a user device. In addition, in FIG. 6, for convenience, the filters composed of the main patterns are called main filters.

The server 100' is configured to perform preprocessing on the main filters, and generates optimization data and operation instructions corresponding to the main filters.

As illustrated in FIG. 6, the server 100' includes a memory 110, a processor 120, and a communicator 130. The processor 120 learns a plurality of filters applied to the neural network, selects the main filters of the plurality of learned filters, and stores the main filters in the memory 110. The processor 120 may select at least one filter of a predetermined pattern as the main filter in the order of the high frequency of the pattern among the learned filters. For example, as illustrated in FIG. 6, the processor 120 may store first data to third data learned for first to third filters, which are the main filters, in the memory 110.

Referring to FIG. 6, the processor 120 may generate first to third optimization data, respectively, in which the first to third filters are optimized using a data analysis software tool. The first to third optimization data each include a tag indicating a pattern type of the first to third filters determined according to an arrangement pattern of the non-zero elements included in each of the first to third filters.

On the other hand, the first to third optimization data may be data from which the zero elements included in the filter are removed. In this case, the first to third optimization data may have a smaller number of occupied bits than original learned data. That is, in this case, since the first to third optimization data include only the non-zero elements and the tag indicating the type of the pattern of the filter, the number of occupied bits may be saved compared to the original learned data which occupies a certain number of bits regardless of the type of filter. In this case, the number of bits representing the optimization data may be determined differently depending on values of the non-zero elements. For example, the non-zero elements at positions '1', '4', and '7' in the first optimization data may be respectively represented by 8 bits, which is an optimal number of bits for representing each non-zero element. On the other hand, the non-zero elements at positions '1' and '9' in the second optimization data may be respectively represented by 16 bits, which is an optimal number of bits for representing each non-zero element.

Meanwhile, the processor 120 may generate first to third operation instructions, which are operation instructions for the first to third filters, respectively, based on the first to third optimization data. In this case, the operation instructions are instructions for causing the processing element determined according to the main pattern among the plurality of processing elements included in the operation module 220 included in the user device 200 to perform the operation determined according to the main pattern. The first to third operation instructions may be determined according to the pattern type of the first to third filters.

The processor 120 may transmit the first to third optimization data and the first to third operation instructions to the user device 200 through the communicator 130.

Referring to FIG. 6, the user device 200 may receive the first to third optimization data and the first to third operation instructions through the communicator. The processor 240 may store the first to third optimization data and the first to third operation instructions which are received in the memory 230. In this case, the first to third optimization data and the first to third operation instructions may be separately stored in different regions (data memory, operation instruction memory) of the memory 230.

The first to third optimization data stored in the memory 230 may be input to the operation module 220, and the operation module 220 may perform operations according to the first to third operation instructions, respectively, when the input first to third optimization data is applied to the input image. The processor 240 performs a filtering operation by convolution by using a processing element determined by the first to third operation instructions for each of the first to third optimization data among the plurality of processing elements included in the operation module 220.

On the other hand, whenever the first to third optimization data stored in the server 100' is changed, the processor 240 may receive the changed first to third optimization data from the server 100' and perform an update. In addition, when the main filter selected by the server 100' is changed, the processor 240 may receive optimization data and operation instructions for the changed main filter and perform an update.

Figure 7A:
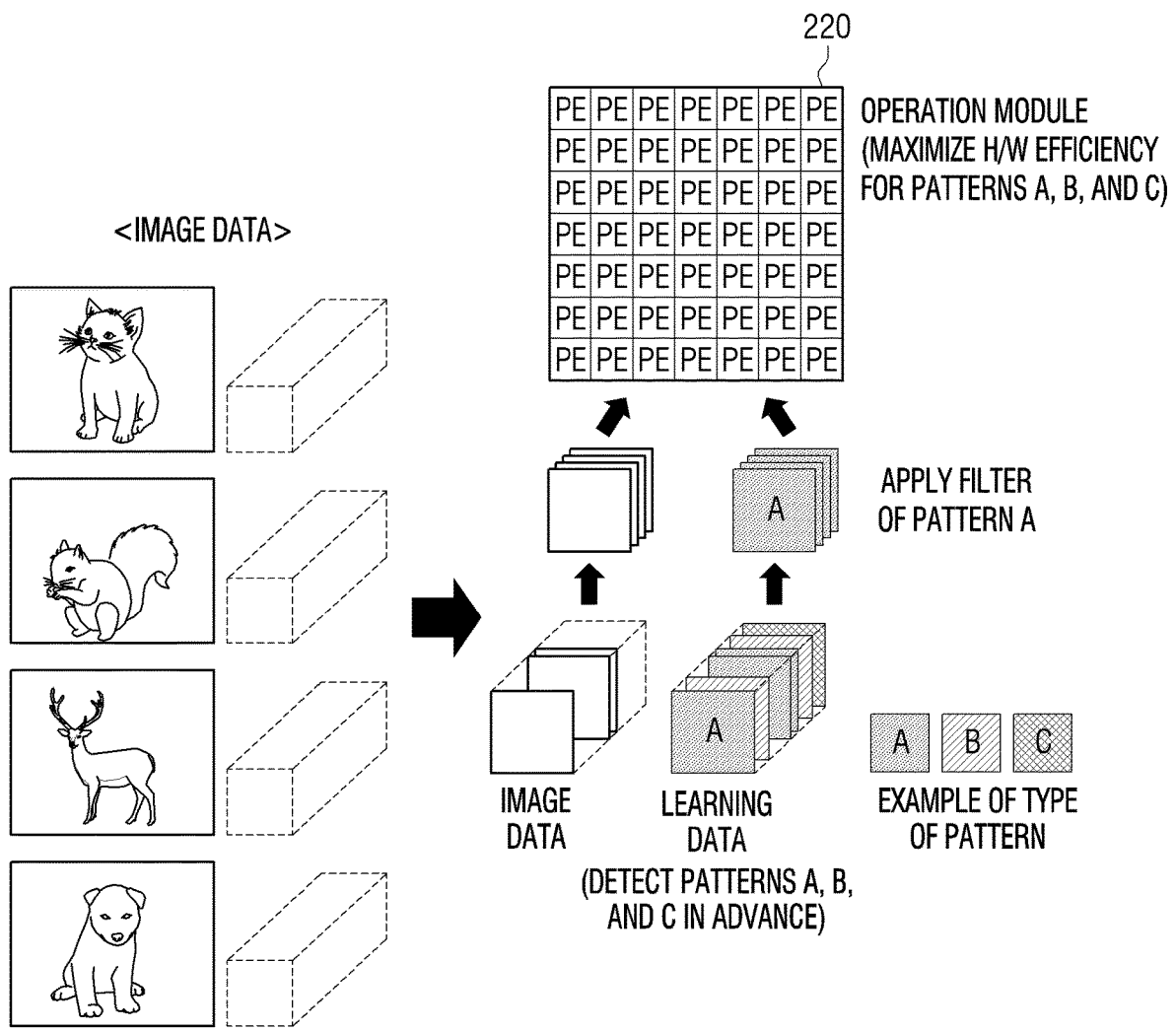
FIGS. 7A and 7B are diagrams for describing a method for learning various types of input images and recognizing the input images using learned data according to an embodiment of the disclosure.
Figure 7B:
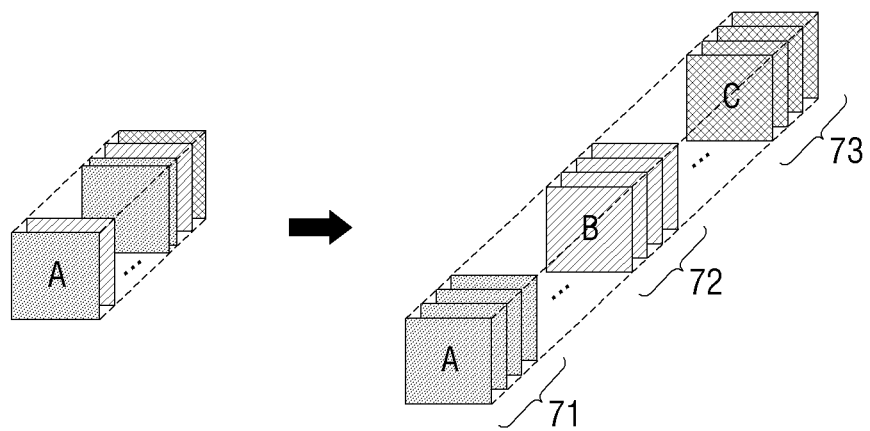

FIGS. 7A and 7B are diagrams for describing a method for learning various types of input images and recognizing the input images using learned data according to an embodiment of the disclosure.

As illustrated in FIG. 7A, the processor 240 of the second electronic device 200 may control the operation module 220 to perform an operation according to a CNN algorithm for image recognition, and may recognize various animal images such as "cat", "squirrel", "deer", and "dog".

In this case, the optimization data learned about the main pattern may be stored in the memory 230 of the second electronic device 200 in advance. The optimization data may include, for example, respective data for the tag each indicating the type of the main pattern of the filter composed of a pattern A, a pattern B, and a pattern C, and the non-zero elements. In addition, the memory 230 may store operation instructions corresponding to the tags representing the type of the pattern A, the pattern B, and the pattern C, respectively.

When the image data is input to the operation module 220, filters of various patterns are applied to the image data, and for the filter of the main pattern, the operation module 220 performs the operation using the learned optimization data and the operation instruction. The processor 240 selects at least one filter of pattern A from the plurality of learned filters used for filtering the image data, and uses preprocessing data for the filter of the pattern A when applying the selected filter of the pattern A to the image data. That is, the processor 240 inputs the non-zero elements included in the optimization data corresponding to the filter of the pattern A to the operation module 110, when applying the filter of the pattern A to the image data. In this case, the processor 240 may extract an operation instruction corresponding to the pattern A from the memory 230, based on the tag indicating the type of the pattern A. The processor 240 may input the extracted operation instruction to the operation module 220 to control the filtering operation by the filter including the pattern A to be performed.

In this case, as illustrated in FIG. 7A, the processor 240 may rearrange a plurality of filters (learned data) to be sequentially applied to the operation module 220 for each filter of the main pattern. Specifically, referring to FIG. 7B, the processor 240 selects a plurality of filters 71 of the pattern A from the plurality of filters generated by the learning. Since a result value obtained by performing the filtering operation is not affected by the order of the filters due to the characteristics of the convolution operation, the processor 240 may rearrange the plurality of filters so that the plurality of selected filters 71 of the pattern A are preferentially applied to the operation module 220. That is, the processor 240 may obtain an operation instruction corresponding to the pattern A from the memory 230 only once, and may collectively process the filtering operation by the plurality of filter 71 of the pattern A having the same pattern by using the obtained operation instruction. In such a manner, the processor 240 may select and rearrange a plurality of filters 72 of a pattern B and a plurality of filters 73 of a pattern C, respectively, for each of the same patterns from the plurality of filters sequentially applied to the filtering of the input data, obtain operation instructions corresponding to the filters 72 of the pattern B and the filters 73 of the pattern C, respectively, only once, and collectively process a filtering operation by the filters 72 of the pattern B and the filters 73 of the pattern C.

Accordingly, the processor 240 may reduce a load and degradation in operation speed caused by repeatedly loading the operation instructions from the memory 230.

Figure 8:
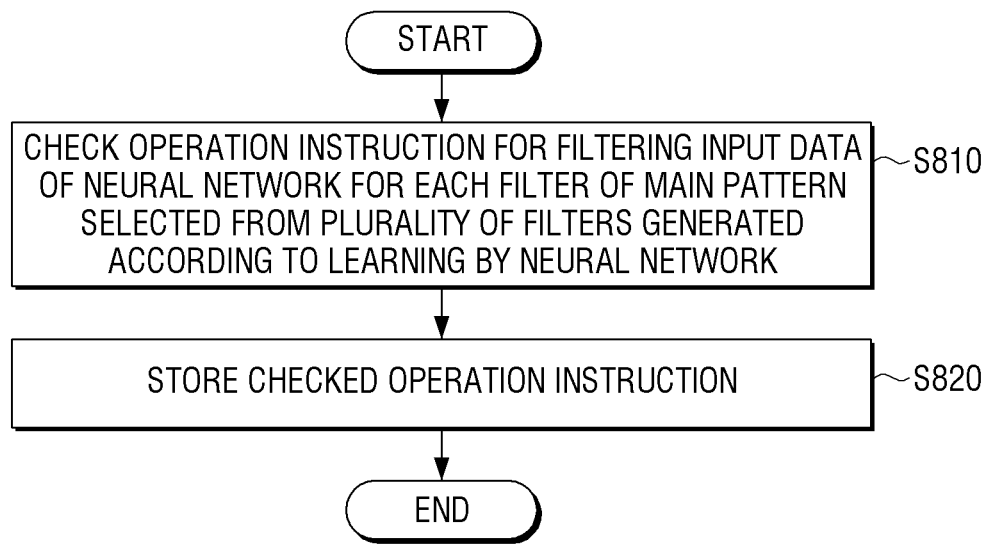
FIG. 8 is a flowchart for describing a method of performing learning by a neural network according to an embodiment of the disclosure.

FIG. 8 is a flowchart for describing a method for controlling a first electronic device according to an embodiment of the disclosure.

First, an operation instruction for filtering input data of a neural network is checked for each filter of the main pattern selected from a plurality of filters generated according to learning by the neural network (S810). In this case, the filter of the main pattern may be a filter selected based on a statistical weight of an operation amount occupied by each pattern for each pattern in which the non-zero elements are arranged, in the plurality of generated filters. Alternatively, the main pattern may be selected based on a frequency for each pattern in which the non-zero elements are arranged, in the plurality of generated filters. In this case, the plurality of filters generated by the learning may be different depending on a learning object of the neural network.

Thereafter, an operation instruction for filtering the input data of the neural network for each filter of the selected main pattern is checked (S820). In this case, optimization data in which zero elements are removed from the filter of the selected main pattern, and an operation instruction corresponding to the optimization data may be checked.

Thereafter, the checked operation instruction is stored.

In an embodiment, a filtering operation by the filter of the main pattern may be performed according to the stored operation instruction.

In addition, in another embodiment, the stored operation instruction may be transmitted to the second electronic device. In this case, the second electronic device may filter the input data of the neural network by using the operation instruction.

As described above, by preprocessing the filter of the main pattern which occupies the main operation amount in advance, the burden on the memory is lowered and the operation efficiency is increased.

A learning method by the neural network according to the diverse embodiments described above may be implemented as a program and stored in various recording media. That is, a computer program which is processed by various processors and is capable of executing the above-described various display methods may also be used in a state stored in the recording medium. As an example, a non-transitory computer readable medium in which a program performing an operation of checking an operation instruction for filtering input data of a neural network for each filter of a main pattern selected from a plurality of filters according to learning by the neural network and an operation storing the checked operation instruction is stored may be provided.

The non-transitory computer readable medium is not a medium that stores data for a short time such as a register, a cache, a memory, or the like, but means a machine readable medium that semi-permanently stores the data. Specifically, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Although the embodiments of the disclosure have been illustrated and described hereinabove, the disclosure is not limited to the specific embodiment described above, but may be variously modified by those skilled in the art to which the disclosure pertains without departing from the scope and spirit of the disclosure as claimed in the claims. These modifications should also be understood to fall within the technical spirit and scope of the disclosure.

The invention claimed is:

1. An electronic device comprising:
 a memory; and
 a processor configured to:
  check an operation instruction for filtering input data of a neural network for each filter of a main pattern selected from a plurality of filters generated according to learning by the neural network the processor selecting the main pattern from the generated plurality of patterns based on a frequency for each pattern in which non-zero elements are arranged, the main pattern being a pattern in which non-zero elements are arranged, and
  store the checked operation instruction in the memory.

2. The electronic device as claimed in claim 1, wherein the processor performs a filtering operation by the filter of the main pattern by using the stored operation instruction.

3. The electronic device as claimed in claim 1, wherein the filter of the main pattern is a filter selected based on a statistical weight of an operation amount occupied by each pattern for each pattern in which non-zero elements are arranged, in the generated plurality of filters.

4. The electronic device as claimed in claim 1, further comprising a communicator,
 wherein the processor transmits the operation instruction to another electronic device through the communicator, and
 the other electronic device performs a filtering operation by the filter of the main pattern by using the operation instruction.

5. The electronic device as claimed in claim 1, wherein the processor checks optimization data in which zero elements are removed from the selected filter of the main pattern and an operation instruction corresponding to the optimization data, and stores the checked optimization data and operation instruction in the memory.

6. The electronic device as claimed in claim 5, wherein the processor performs a filtering operation by the filter of the main pattern by using the stored optimization data and an operation instruction corresponding to identification information included in the optimization data.

7. The electronic device as claimed in claim 5, further comprising a communicator,
 wherein the processor transmits the optimization data and the operation instruction to another electronic device through the communicator, and
 the other electronic device performs a filtering operation by the filter of the main pattern by using the received optimization data and an operation instruction corresponding to identification information included in the optimization data.

8. A method for controlling an electronic device, the method comprising:
 checking an operation instruction for filtering input data of a neural network for each filter of a main pattern selected from a plurality of filters generated according to learning by the neural network the main pattern selected from the generated plurality of patterns based on a frequency for each pattern in which non-zero elements are arranged, the main pattern being a pattern in which non-zero elements are arranged; and
 storing the checked operation instruction.

9. The method as claimed in claim 8, further comprising performing a filtering operation by the filter of the main pattern by using the stored operation instruction.

10. The method as claimed in claim 8, wherein the filter of the main pattern is a filter selected based on a statistical weight of an operation amount occupied by each pattern for each pattern in which non-zero elements are arranged, in the generated plurality of filters.

11. The method as claimed in claim 8, further comprising transmitting the stored operation instruction to another electronic device,
 wherein the other electronic device performs a filtering operation by the filter of the main pattern by using the operation instruction.

12. The method as claimed in claim 8, wherein in the checking of the operation instruction, optimization data in which zero elements are removed from the selected filter of the main pattern and an operation instruction corresponding to the optimization data are checked, and in the storing of the checked operation instruction, the checked optimization data and operation instruction are stored.

13. The method as claimed in claim 12, further comprising performing a filtering operation by the filter of the main pattern by using the stored optimization data and an operation instruction corresponding to identification information included in the optimization data.

* * * * *